(12) United States Patent
Tamura et al.

(10) Patent No.: US 8,042,876 B2
(45) Date of Patent: Oct. 25, 2011

(54) TRANSPORTER VEHICLE

(75) Inventors: Katsumi Tamura, Omitama (JP);
Satoru Kaneko, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 333 days.

(21) Appl. No.: 12/391,394

(22) Filed: Feb. 24, 2009

(65) Prior Publication Data

US 2009/0218875 A1 Sep. 3, 2009

(30) Foreign Application Priority Data

Feb. 29, 2008 (JP) ................................. 2008-051030

(51) Int. Cl.
*B60P 1/16* (2006.01)
(52) U.S. Cl. ...................................... 298/22 C
(58) Field of Classification Search ................ 298/17 R, 298/19 R, 22 R, 22 C, 22 P; 137/596
See application file for complete search history.

(56) References Cited

U.S. PATENT DOCUMENTS 6,561,589 B2 * 5/2003 Jones ........................... 298/19 B

FOREIGN PATENT DOCUMENTS

| JP | 2004-268646 A | 9/2004 |
| JP | 2007-62697 A | 3/2007 |

* cited by examiner

*Primary Examiner* — Stephen Gordon
(74) *Attorney, Agent, or Firm* — Mattingly & Malur, PC

(57) ABSTRACT

A branch line branching from midway of a hydraulic conduit or each of actuator side oil passages to connect a bottom side oil chamber of a hoist cylinder to a tank is provided to the hydraulic conduit or each of the actuator side oil passages. A manual operation valve for variably adjusting the flow rate in accordance with the operation of a lever handle is provided in the branch line. Maintenance work is performed with an engine stopped in this state. Subsequently, when a vessel is lowered onto a vehicle body, hydraulic oil can be discharged through the branch line from the bottom side oil chamber of the hoist cylinder to the tank by opening the manual operation valve, so that the hoist cylinder can be automatically contracted.

5 Claims, 6 Drawing Sheets

TRANSPORTER VEHICLE

BACKGROUND ART

1. Field of the Invention

The present invention relates to a transporter vehicle such as a dump truck which is suitably used in transporting crushed stones excavated from such as an open-pit stope, a stone quarry, a mine, or dug earth and sand or the like.

2. Description of Prior Art

In general, a large-size transporter vehicle called a dump truck has a liftable vessel (loading platform) on a frame of a vehicle body, and carries and transports objects to be transported such as crushed stones or earth and sand or the like to an unloading site or a cargo collection site of, for instance, an exit port in a state in which the objects to be transported are loaded in a large quantity on the vessel (e.g., see Japanese Patent Laid-Open No. 2004-268646, Japanese Patent Laid-Open No. 2007-62697).

A transporter vehicle of this type according to the prior art is comprised of a vehicle body capable of self traveling; a loading platform which is provided on the vehicle body in such a manner as to be capable of being moved vertically (tilted) and on which the objects to be transported are loaded; a hoist cylinder which is telescopically provided between the loading platform and the vehicle body and in which a rod is extended at the time of discharging the objects to be transported from the loading platform so as to raise the loading platform diagonally backward with respect to the vehicle body; and a control valve unit which is provided between the hoist cylinder and a hydraulic power source to extend or contract the rod of the hoist cylinder, and which controls the supply and discharge of pressure oil to the hoist cylinder.

Further, the control valve unit used in such a transporter vehicle has a total of four changeover positions, including a raising position for raising the loading platform by extending the hoist cylinder by supplying and discharging the pressure oil from the hydraulic power source in one direction; a lowering position for lowering the loading platform downward by contracting the hoist cylinder by supplying and discharging the pressure oil in the other direction; a floating position for allowing the self-weight fall of the loading platform by contracting the hoist cylinder by the self-weight of the loading platform side; and a neutral position for stopping the movement of the hoist cylinder by stopping the supply and discharge of the pressure oil.

Here, the control valve unit is selectively changed over to one changeover position among the total of four changeover positions by manually performing the tilting operation of a remote control means such as an operating lever. Further, after the transporter vehicle traveled by itself to the cargo collection site in the state in which the earth and sand or crushed stones or the like are loaded on the loading platform, the rod of the hoist cylinder is extended to raise the loading platform diagonally backward. Through this raising operation, the earth and sand or crushed stones or the like are discharged to the cargo collection site along the tilting direction of the loading platform.

By the way, in the above-described transporter vehicle according to the prior art, the control valve unit can be changed over to one of the four changeover positions in accordance with the remote control of the operating lever or the like by driving a main hydraulic pump, a pilot pump and the like by an engine serving as a prime mover, thereby making it possible to control the extending or contracting motion of the hoist cylinder for moving the loading platform on the vehicle body.

In contrast, when the engine is stopped, since the hydraulic pump, the pilot pump, and the like are also stopped, the control valve unit cannot be changed over by the remote control. However, at the time of performing maintenance, inspection, and the like of the transporter vehicle, there are cases where, for example, by stopping the engine with the loading platform kept raised diagonally backward, maintenance work is hence performed in the state in which the noise due to the engine sound is eliminated while ensuring the safety of the operator.

For this reason, according to the prior art, the engine is started again upon completion of the maintenance work, and in this state, the hoist cylinder is contracted by the self-weight on the loading platform side by changing over the control valve unit to, for example, the floating position, and the engine is stopped when the loading platform is seated onto the vehicle body.

However, there are problems in that the temporary operation of the engine for the sole purpose of lowering the loading platform is wasteful from the viewpoint of energy saving, and it also constitutes an extra burden on the operator.

SUMMARY OF THE INVENTION

In view of the above-described problems of the prior art, an object of the present invention is to provide a transporter vehicle in which even if the engine is kept stopped at the time of lowering the loading platform from the raised state, the impact at the time when the loading platform is seated onto the vehicle body can be alleviated, thereby making it possible to reduce the discomfort and the like of the operator and improve the durability and service life of the apparatus.

To solve the above-described problems, the present invention is applied to a transporter vehicle comprising: a vehicle body having an engine accommodated in an interior thereof and a cab provided on an upper side of a front portion thereof; a loading platform which is provided on the vehicle body in such a manner as to be capable of being moved vertically by the use of a rear portion side as a fulcrum so as to load objects to be transported and a front portion thereof serving as a protector for covering the cab from above; a hoist cylinder which is telescopically provided between the loading platform and the vehicle body and in which a rod is extended so as to raise the loading platform; a hydraulic power source which is constituted by a hydraulic pump rotatively driven by the engine and a tank and is adapted to supply pressure oil to the hoist cylinder; and a control valve unit which is provided between the hydraulic power source and the hoist cylinder, and which effects changeover control of the supply and discharge of the pressure oil with respect to the hoist cylinder.

Further, a characteristic of the configuration adopted by the present invention lies in a configuration in which a manual operation valve which is capable of lowering the loading platform onto the vehicle body when the engine is stopped in a state in which the loading platform is raised by the extension of the rod is provided between the tank of the hydraulic power source and the hoist cylinder.

By this structure, at the time of performing maintenance, inspection, and the like of the transporter vehicle, if the hoist cylinder is extended greatly by operating the control valve unit to changeover control with the engine set in an operating condition, the loading platform can be rotated so as to be raised from the vehicle body. Further, if the engine is stopped in this state, maintenance can be performed safely in a state in which noise due to engine sound is eliminated. Next, when the loading platform is lowered onto the vehicle body in this state with the engine stopped, by opening the manual operation valve, the hydraulic oil can be discharged from the oil chamber of the hoist cylinder to the tank, so that the hoist cylinder can be automatically contracted. At the same time, by lowering the speed with which the loading platform is lowered, it is possible to minimize the impact at the time when the loading platform is seated onto the vehicle body.

As a result, even when the engine is kept stopped at the time of lowering the loading platform of the transporter vehicle from the raised state, it is possible to alleviate the impact at the time when the loading platform is seated onto the vehicle body. Hence, it is possible to reduce the discomfort and the like of the operator and improve the durability and service life of the apparatus. In addition, the contracting speed of the hoist cylinder can be variably adjusted by the manual operation valve, thereby making it possible to easily alleviate the impact at the time when the loading platform is seated onto the vehicle body.

Further, according to the present invention, a hydraulic line connecting said control valve unit and the hoist cylinder is provided with a branch line having one side branching from said hydraulic line and another side connected to the tank of said hydraulic power source, and said manual operation valve is provided in said branch line.

By this structure, when the manual operation valve is opened, the hydraulic oil can be discharged from the oil chamber of the hoist cylinder to the tank through the branch line branching from the hydraulic line connecting the control valve unit and the hoist cylinder. Further, in this case, as the manual operation valve is first opened up to a fully opened position, a large amount of hydraulic oil can be discharged in correspondence with the cross-sectional area of the branch line, thereby making it possible to make the contracting speed of the hoist cylinder fast. Further, at a stage when the loading platform falling by its self-weight has approached the vehicle body side, the contracting speed of the hoist cylinder can be made gradually slow by decreasing the opening of the manual operation valve, thereby making it possible to alleviate the impact easily when the loading platform is seated onto the vehicle body.

Still, according to the present invention, the manual operation valve is provided at a position which is in a vicinity of the cab. By this way, the operator who has climbed into the cab is able to approach the manual operation valve and perform the manual operation easily, thereby making it possible to reduce the burden on the operator and enhance the operability.

Further, according to the present invention, the manual operation valve is provided at a position where it is covered from above by the protector of the loading platform. By this way, even when, for instance, earth and sand, mud, or the like attached to the peripheries of the loading platform have dropped so as to be exfoliated in conjunction with the lowering motion of the loading platform, the operator can be protected from such droppings by the protector of the loading platform, thereby making it possible to prevent the droppings from colliding against the head of the operator.

Furthermore, according to the present invention, the manual operation valve has a lever for changing through manual operation an opening of a valve body for variably adjusting a flow rate of hydraulic oil flowing out from a bottom side oil chamber of the hoist cylinder. By this way, the operator is able to easily perform the opening and closing operation of the manual operation valve while gripping the lever handle, and smoothly perform in a simple operation the flow rate adjustment of the hydraulic oil which is discharged from the bottom side oil chamber of hoist cylinder.

DETAILED DESCRIPTION OF THE INVENTION

Hereafter, with reference to the accompanying drawings, a detailed description will be given of a transporter vehicle in accordance with an embodiment of the invention by citing as an example a dump truck which transports crushed stones or other similar objects excavated from mine.

Figure 1:
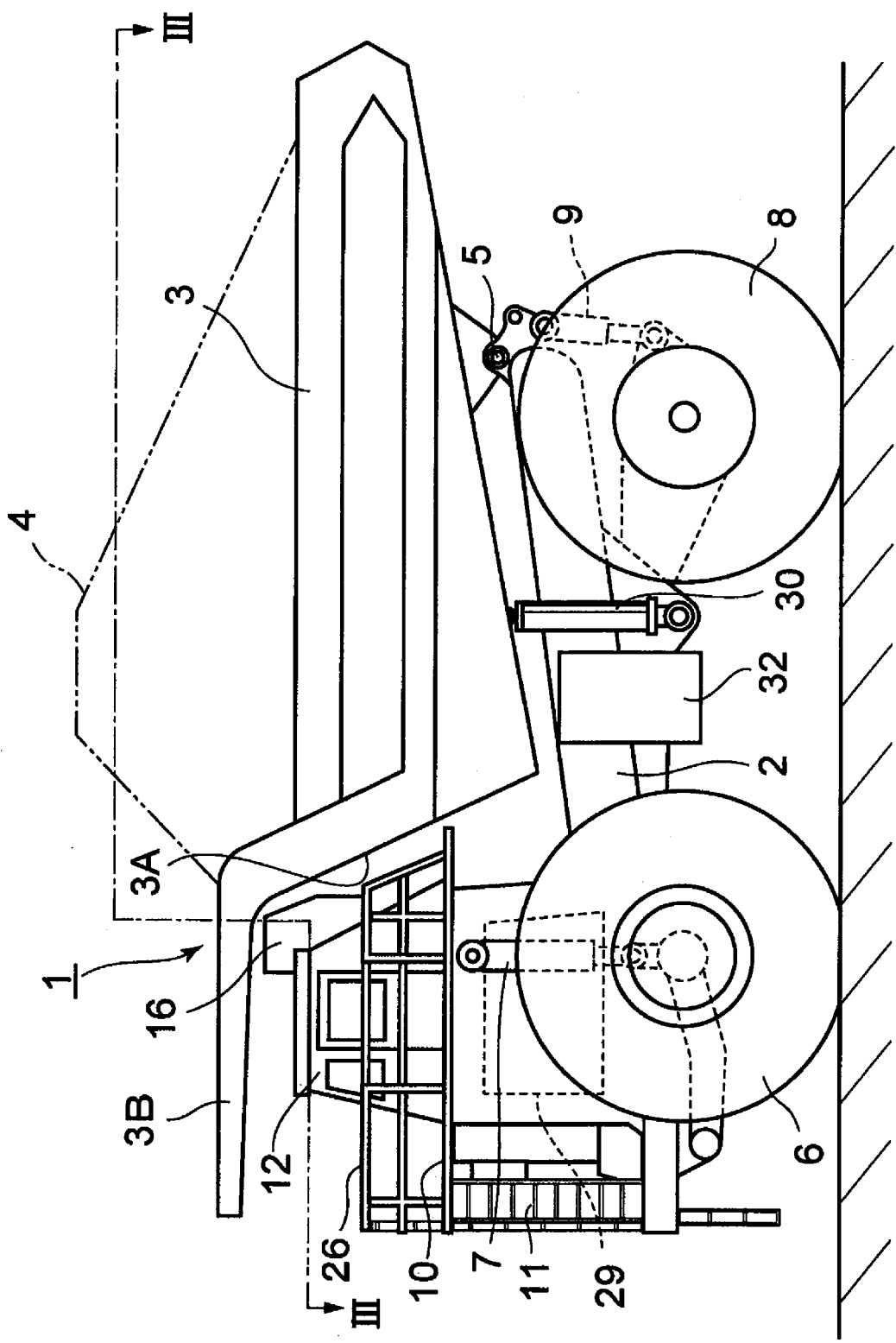
FIG. 1 is a front view illustrating a dump truck according to an embodiment of the present invention.
Figure 2:
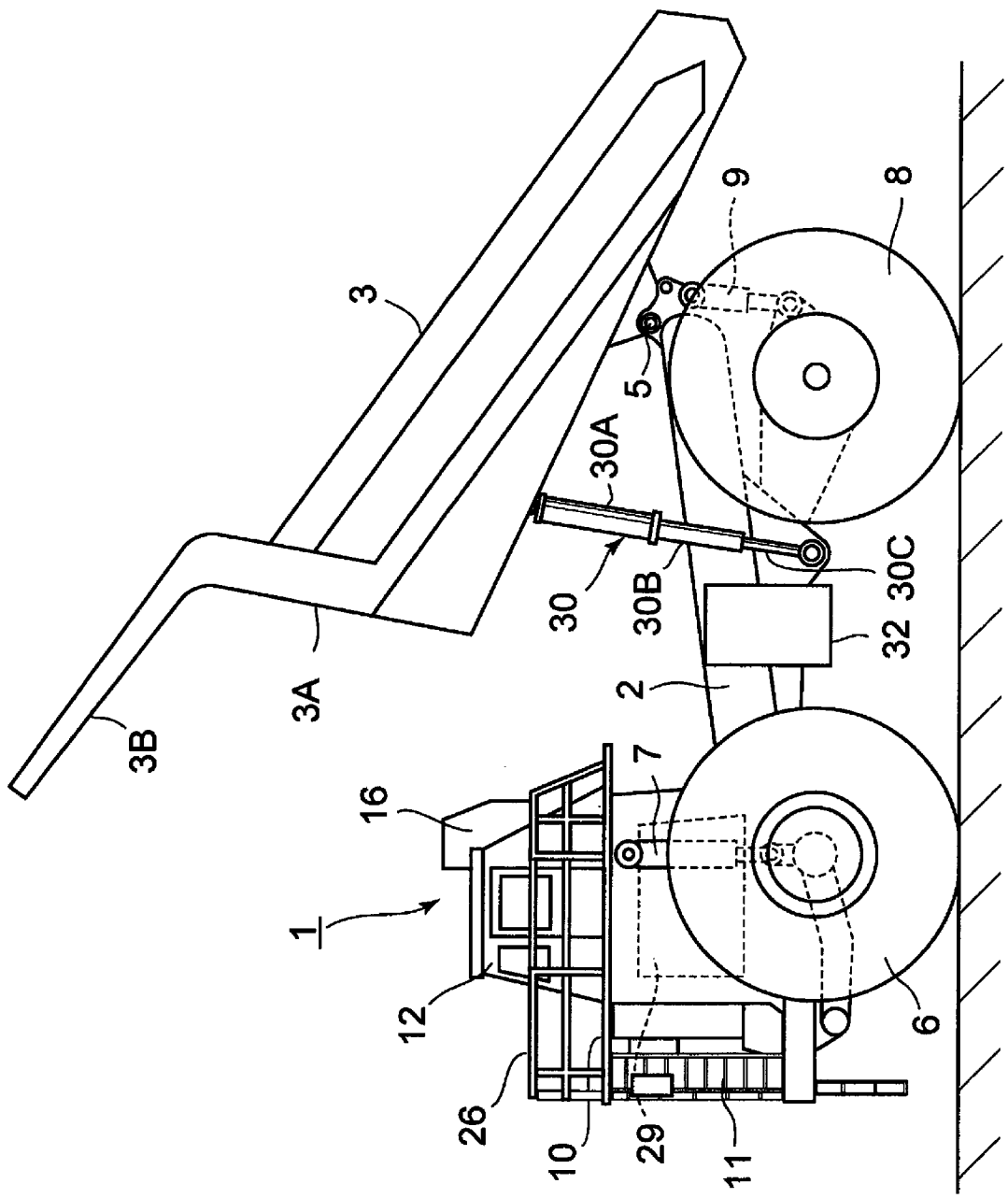
FIG. 2 is a front view illustrating a state in which a vessel of the dump truck is raised diagonally backward.

Here, FIGS. 1 to 6 show an embodiment of the invention. In the drawings, denoted at 1 is a dump truck which is a large-size transporter vehicle. As shown in FIGS. 1 and 2, the dump truck 1 is largely comprised of a vehicle body 2 forming a rigid frame structure and a vessel 3 serving as a loading platform which is tiltably mounted on the vehicle body 2.

Further, the vessel 3 is formed as a large-size container whose overall length reaches as much as 10 to 13 meters to load a large volume of heavy objects to be transported such as crushed stones or other similar objects (hereafter referred to as the crushed stones 4). Its rear side bottom portion is coupled to a rear end side of the vehicle body 2 vertically movably (tiltably) by using a connecting pin 5 as a fulcrum. In addition, a protector 3B is integrally provided on a front wall portion 3A of the vessel 3 in such a manner as to extend horizontally forward from its upper portion. This protector 3B covers a below-described cab 12 from the upper side, and its distal end side extends to a position above a below-described ladder 11.

Namely, the bottom side of the vessel 3 is rotatably supported by the rear side of the vehicle body 2 by using the connecting pin 5. Further, as a below-described hoist cylinder 30 is extended or contracted, the protector 3B which is on the front end side of the vessel 3 is rotated (raised or lowered) vertically with the connecting pin 5 as a fulcrum. Consequently, the vessel 3 is rotated between a transporting position shown in FIG. 1 and a dumping position shown in FIG. 2, and the crushed stones 4 loaded in the vessel 3 are discharged at a predetermined cargo collection site from the vessel 3 which has tilted backward, as shown in FIG. 2.

Indicated at 6 are left and right front wheels (only one is shown) which are provided rotatably on the front side of the vehicle body 2, and the front wheels 6 constitute steered wheels which are steered by an operator of the dump truck 1. Further, the front wheels 6 are formed with a tire diameter (outside diameter dimension) of, for example, as much as 2 to 4 meters in the same way as below-described rear wheels 8. Here, a front wheel side suspension 7 constituted by a hydraulic shock absorber or the like is provided between the front portion of the vehicle body 2 and the front wheel 6. This front wheel side suspension 7 supports the front side of the vehicle body 2 at a position between the same and the front wheel 6.

Indicated at 8 are left and right rear wheels (only one is shown) which are provided rotatably on the rear side of the vehicle body 2, and the rear wheels 8 constitute drive wheels of the dump truck 1 which are rotatively driven by a traveling drive unit (not shown). Further, a rear wheel side suspension 9 constituted by a hydraulic shock absorber or the like is provided between the rear portion of the vehicle body 2 and the rear wheel 8. This rear wheel side suspension 9 supports the rear side of the vehicle body 2 at a position between the same and the rear wheel 8.

Figure 3:
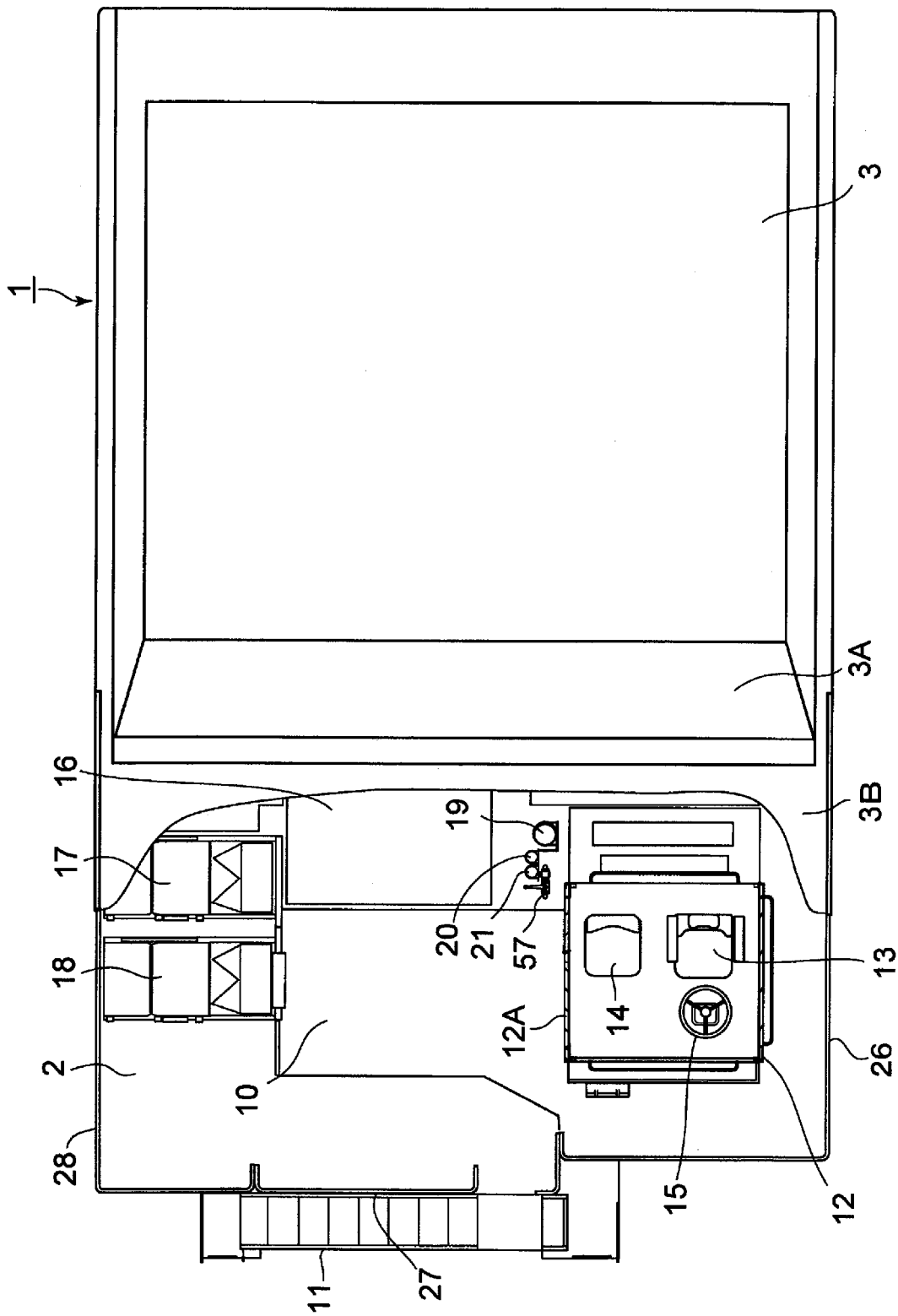
FIG. 3 is a fragmentary plan view of the dump truck, taken from the direction of arrows III-III in FIG. 1.

Indicated at 10 is a floor which is provided on the upper side of the front portion of the vehicle body 2 by being located on the lower side of the protector 3B. The floor 10 is disposed at a position above the front wheels 6, as shown in FIG. 1, to form a flat passageway surface on the upper side of the front portion of the vehicle body 2. Further, the cab 12, a control cabinet 16, and the like, which will be described after, are installed on the upper side of the floor 10, as shown in FIG. 3.

Indicated at 11 is a ladder serving as ascending/descending steps provided on the front side of the vehicle body 2. The ladder 11 extends in a diagonally inclined manner from the lower side of the front portion of the vehicle body 2 toward the front side of the floor 10, as shown in FIGS. 1 and 3, and constitutes steps for such as the operator to get on or get off from the floor 10.

Denoted at 12 is a cab which is provided on the floor 10 of the vehicle body 2 by being located under the lower side of the protector 3B. The cab 12 defines an operating room in its interior, and a door 12A for the operator of the dump truck 1 to get into or get off from the inside is openably provided in a side surface of the cab 12. Two seats 13 and 14, and a handle 15 are provided inside the cab 12, as exemplified in FIG. 3. In addition, also provided inside the cab 12 is a starter switch for starting and stopping a below-described engine 29, an accelerator pedal, a brake pedal, an operating lever (neither are shown) for remote controlling a below-described control valve unit 36, and the like.

Indicated at 16 is a control cabinet which is provided at the upper side position of the floor 10, and the control cabinet 16 is constituted by a control panel, an inverter, and the like for controlling a motor, engine speed, and electric current generated by the below-described engine 29 through a generator (not shown). Furthermore, as shown in FIG. 3, grid boxes 17 and 18 are provided at the right side position which is the opposite side to the cab 12 with the control cabinet 16 located in between. These grid boxes 17 and 18 constitute units made up of a resistor which consumes dc electric power during deceleration of the vehicle body and a blower for cooling that resistor.

Indicated at 19, 20, and 21 are accumulators respectively disposed between the cab 12 and the control cabinet 16. Of these, the accumulator 19 having the largest diameter constitutes an accumulator for power steering for assisting the steering force at the time of steering the handle 15 in the cab 12 by hydraulic pressure. Further, the other accumulator 20 constitutes an accumulator which is used for brake units on the rear wheel side, and the still other accumulator 21 constitutes an accumulator which is used for brake units on the front wheel side.

Figure 4:
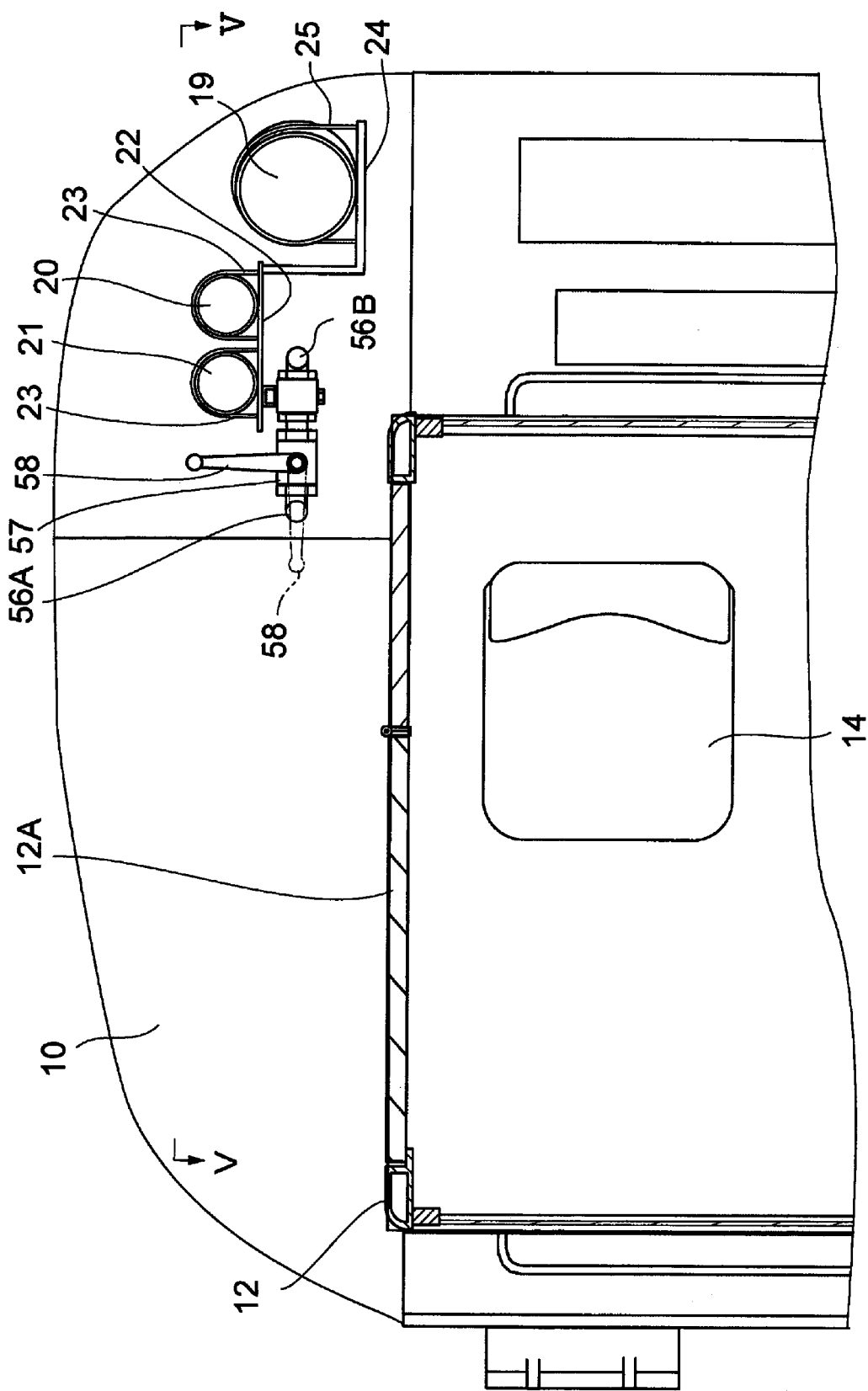
FIG. 4 is a plan view illustrating in an enlarged form accumulators, a manual operation valve, and the like in FIG. 3.
Figure 5:
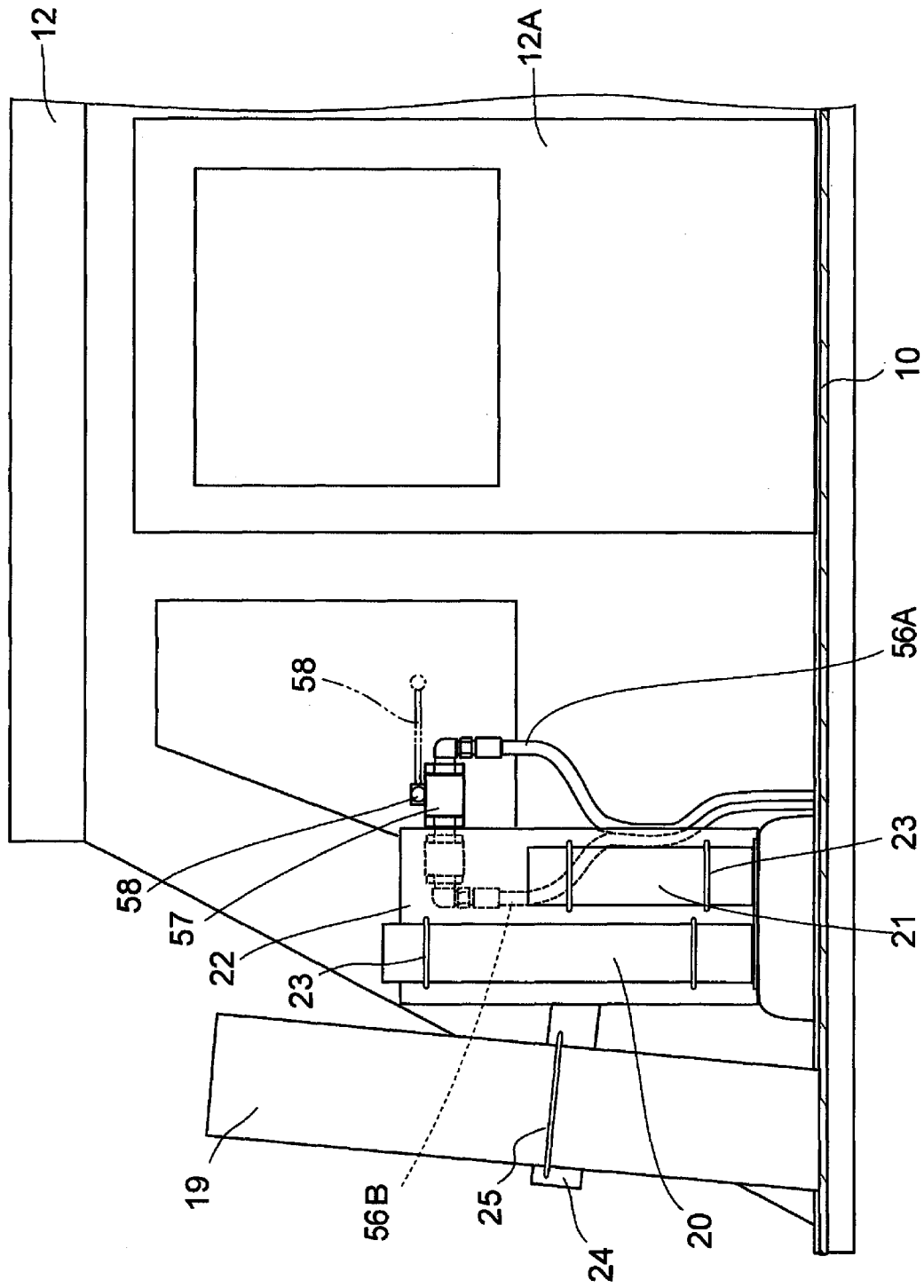
FIG. 5 is a sectional view of the accumulators, the manual operation valve, and the like, taken from the direction of arrows V-V in FIG. 4.

Indicated at 22 is a supporting bracket for supporting the accumulators 20 and 21 on the floor 10. As shown in FIGS. 4 and 5, the supporting bracket 22 is formed by the use of a flat plate body which is erected in such a manner as to rise vertically upward from the floor 10. Further, the accumulators 20 and 21 are fixedly mounted on one side surface of the supporting bracket 22 respectively by using a plural number of fixing bands 23 and the like.

Further, a manual operation valve 57, which will be described hereinafter, is mounted on the other side surface (the surface side facing the cab 12 in the transverse direction) of the supporting bracket 22, and an L-shaped mounting plate 24 is fixedly mounted at a position located rearwardly thereof. Further, the accumulator 19 for steering is fixed to this mounting plate 24 by the use of fixing bands 25 and the like. It should be noted that the lower end side (not shown) of the accumulator 19 extends to a position lower than the floor 10, and is fixed to the frame of the vehicle body 2 by the use of another bracket (not shown) and the like.

As shown in FIGS. 4 and 5, the supporting bracket 22, together with the accumulators 19, 20, and 21, the manual operation valve 57, and the like, is disposed at a position in the vicinity of the cab 12, i.e., at a position close to the rear right side surface of the cab 12. Further, as shown in FIGS. 1 and 3, the protector 3B of the vessel 3 substantially completely covers from above the floor 10, the cab 12, the control cabinet 16, the accumulators 19, 20, and 21, the manual operation valve 57, and the like.

Consequently, the protector 3B of the vessel 3 has the functions of protecting the floor 10, the cab 12, the control cabinet 16, the accumulators 19, 20, and 21, the manual operation valve 57, and the like from scattered stones including such as stones and rocks, and of protecting the operator in the cab 12 when the vehicle (dump truck 1) is overturned.

Indicated at 26 is a left side hand rail provided on the left side of the floor 10. As shown in FIG. 3, the hand rail 26 is provided on the floor 10 so as to surround the left side and the front side of the cab 12 with an interval. Further, a passageway is formed on the floor 10 at a position between the cab 12 and the hand rail 26 so that the operator can walk around to check the peripheries of the cab 12.

In addition, as shown in FIG. 3, a front side hand rail 27 is provided around the floor 10 at a position between the floor 10 and the ladder 11, and a right side hand rail 28 is provided at a position corresponding to outer sides of the grid boxes 17 and 18. Further, as these hand rails 26 to 28 surround from the outer side the floor 10 positioned at a high place of, for example, 3 meters or more from the ground surface, the safety of operation (e.g., maintenance work) on the floor 10 is ensured.

Indicated at 29 is the engine as a prime mover provided in the vehicle body 2 by being positioned on the lower side of the floor 10. The engine 29 is constituted by using, for example, a large-size diesel engine and is accommodated in the vehicle body 2. Further, the engine 29 is started and stopped as the operator in the cab 12 manually operates the aforementioned starter switch, and the engine 29 rotatively drives a below-described hydraulic pump 31, shown in FIG. 6, and the like during its operation.

Figure 6:
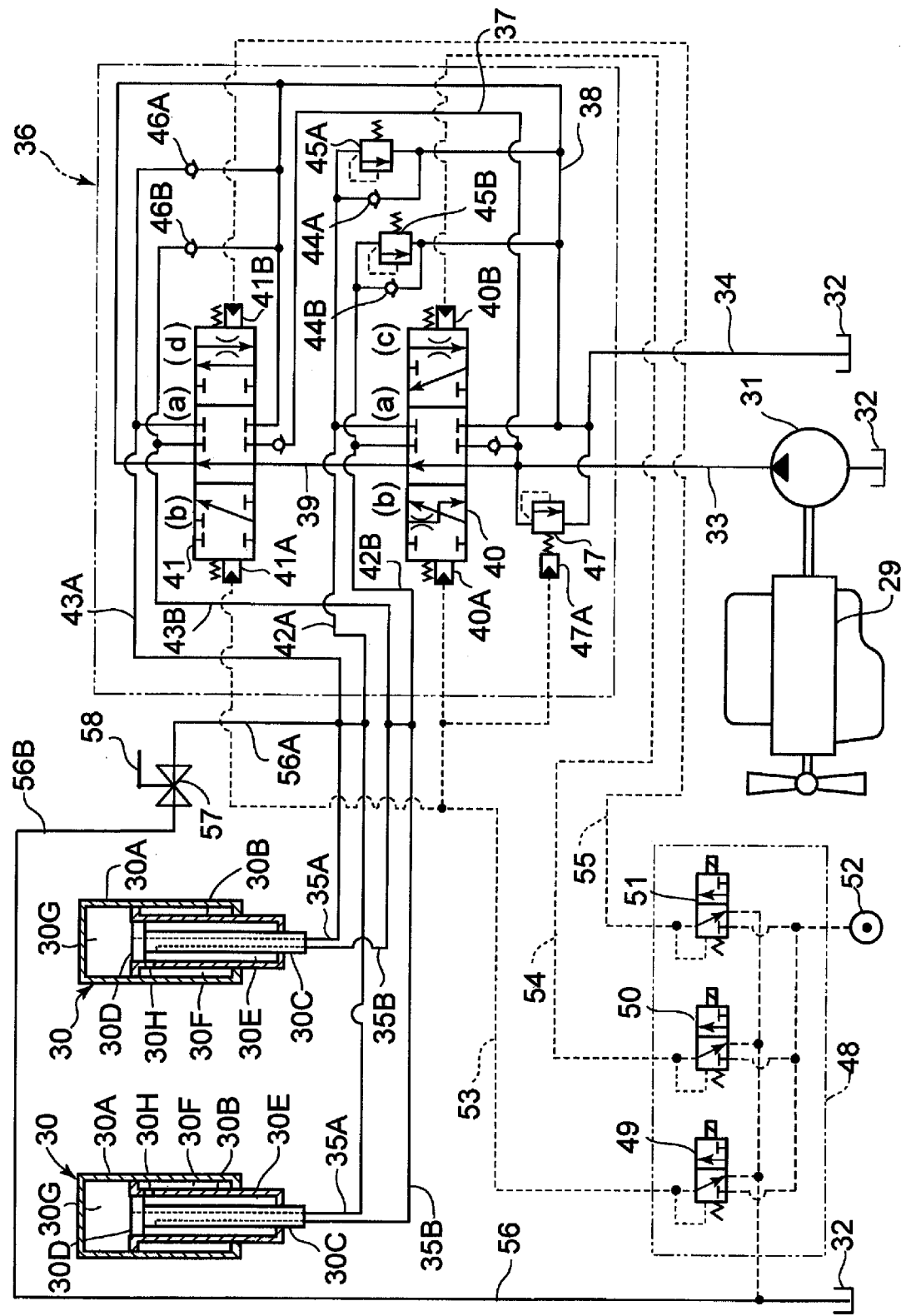
FIG. 6 is a hydraulic circuit diagram illustrating a circuit configuration for effecting the extending and contracting operation of hoist cylinders of the dump truck.

Denoted at 30 is a pair of hoist cylinders (only one is shown in FIG. 1) which are telescopically provided between the vehicle body 2 and the vessel 3. Each of these hoist cylinders 30 consists of a multi-stage (e.g., two-stage) hydraulic cylinder, and is comprised of an outer tube portion 30A positioned on the outer side, an inner tube portion 30B provided telescopically inside the outer tube portion 30A, and a piston rod 30C and a piston 30D provided telescopically inside the inner tube portion 30B, as shown in FIG. 6. Further, the interior of the outer tube portion 30A of the hoist cylinder 30 is partitioned into three chambers including rod side oil chambers 30E and 30F and a bottom side oil chamber 30G by the inner tube portion 30B, the piston rod 30C, and the piston 30D.

At this juncture, the rod side oil chamber 30F is communicated with either one of the rod side oil chamber 30E and the bottom side oil chamber 30G through a port 30H provided in the inner tube portion 30B. Namely, as the piston 30D of the hoist cylinder 30 undergoes sliding displacement in the axial direction (in the vertical direction) inside the inner tube portion 30B, when the piston 30D is positioned on the higher side than the port 30H, the rod side oil chamber 30F is communicated with the rod side oil chamber 30E through the port 30H, as shown in FIG. 6. Meanwhile, when the piston 30D is displaced to a position which is on the lower side than the port 30H, the rod side oil chamber 30F is communicated with the bottom side oil chamber 30G through the port 30H.

In this case, as for each hoist cylinder 30, when pressure oil is supplied from the below-described hydraulic pump 31 into the bottom side oil chamber 30G, the inner tube portion 30B is extended downward together with the piston rod 30C, and when the inner tube portion 30B is maximally extended, only the piston rod 30C is further extended downward, thereby rotating the vessel 3 to the dumping position (see FIG. 2) in which the vessel 3 is raised by being tilted diagonally backward by the use of the connecting pin 5 as the fulcrum. On the other hand, when pressure oil is supplied from the hydraulic pump 31 into the rod side oil chamber 30E in the state in which the piston rod 30C is maximally extended, only the piston rod 30C is first contracted, and then the inner tube portion 30B is subsequently contracted together with the piston rod 30C from the state shown in FIG. 6, whereby the hoist cylinder 30 rotates the vessel 3 to the transporting position (see FIG. 1) in which the vessel 3 is lowered downward by the use of the connecting pin 5 as the fulcrum.

Next, referring to FIG. 6, a description will be given of a hydraulic circuit for driving the hoist cylinders 30.

In FIG. 6, denoted at 31 is a main hydraulic pump which is driven by the engine 29. Further, the hydraulic pump 31 together with an operating oil tank 32 (hereafter referred to as the tank 32) constitutes a hydraulic power source. In this case, the tank 32 is mounted on a side surface of the vehicle body 2 by being positioned below the vessel 3, as shown in FIG. 1.

Here, when the hydraulic pump 31 is rotatively driven by the engine 29, an operating oil (hydraulic oil) accommodated in the tank 32 is sucked into the hydraulic pump 31 and is delivered from the discharge side of the hydraulic pump 31 into a high pressure pump line 33 as pressure oil. In addition, the return oil from the hoist cylinders 30 is discharged into the tank 32 trough a low pressure tank line 34.

Indicated at 35A and 35B is a pair of hydraulic conduits respectively connected to the bottom side oil chamber 30G and the rod side oil chamber 30E of the hoist cylinder 30. These hydraulic conduits 35A and 35B are respectively connected to the hydraulic power source (the hydraulic pump 31 and the tank 32) at their proximal end sides through the below-described control valve unit 36, and are respectively connected to the bottom side oil chamber 30G and the rod side oil chamber 30E of the hoist cylinder 30 at their distal end sides by being passed through the interior of the piston rod 30C of the hoist cylinder 30. Also, the rod side oil chamber 30F of the hoist cylinder 30 is communicated with the rod side oil chamber 30E or the bottom side oil chamber 30G through the port 30H in correspondence with the sliding position of the aforementioned piston 30D. Further, the hydraulic conduits 35A and 35B supply the pressure oil from the hydraulic pump 31 to the bottom side oil chamber 30G, the rod side oil chamber 30E and/or the rod side oil chamber 30F of the hoist cylinder 30. On the other hand, the pressure oil in the bottom side oil chamber 30G, the rod side oil chamber 30E and/or the rod side oil chamber 30F of the hoist cylinder 30 is discharged into the tank 32 through either one of the hydraulic conduits 35A and 35B. Here, the hydraulic conduits 35A and 35B, together with actuator side oil passages 42A and 42B and actuator side oil passages 43A and 43B which will be described after, constitute hydraulic lines for connecting the control valve unit 36 and the hoist cylinders 30, which will be described after.

Denoted at 36 is the control valve unit 36 disposed between, on the one hand, the hydraulic pump 31 and the tank 32 and, on the other hand, the hoist cylinders 30. This control valve unit 36 is largely comprised of a high pressure side passage 37, a low pressure side passage 38, a bypass passage 39, a first directional control valve 40, and a second directional control valve 41. In this case, the first directional control valve 40 and the second directional control valve 41 are parallel connected to each other via the high pressure side passage 37, the low pressure side passage 38, and the bypass passage 39.

In addition, the high pressure side passage 37 of the control valve unit 36 is connected to the discharge side of the hydraulic pump 31 via the pump line 33, while the low pressure side passage 38 thereof is connected to the tank 32 via the tank line 34. In addition, for example, when the directional control valves 40 and 41 are in a neutral position (a), as shown in FIG. 6, the bypass passage 39 of the control valve unit 36 allows the high pressure side passage 37 and the low pressure side passage 38 to communicate with each other to set the hydraulic pump 31 in an unloading state and maintain the discharge pressure (pressure within the pump line 33) in a state of low pressure close to the tank pressure.

Meanwhile, the pair of actuator side oil passages 42A and 42B are provided on the output side of the first directional control valve 40. Further, these actuator side oil passages 42A and 42B are respectively connected to the bottom side oil chamber 30G, the rod side oil chamber 30E and/or the rod side oil chamber 30F of each hoist cylinder 30 via the hydraulic conduits 35A and 35B. Meanwhile, the pair of actuator side oil passages 43A and 43B are provided on the output side of the second directional control valve 41. Further, these actuator side oil passages 43A and 43B are respectively connected to the bottom side oil chamber 30G, the rod side oil chamber 30E and/or the rod side oil chamber 30F of each hoist cylinder 30 via the hydraulic conduits 35A and 35B.

In this case, the first and second directional control valves 40 and 41 of the control valve unit 36 are constituted by, for example, 6-port 3-position directional control valves of a hydraulic pilot type. The first directional control valve 40 has a pair of hydraulic pilot portions 40A and 40B. Further, when the pilot pressure is supplied to the hydraulic pilot portion 40A, the first directional control valve 40 is changed over from the neutral position (a) to the raising position (b), whereas when the pilot pressure is supplied to the hydraulic pilot portion 40B, the first directional control valve 40 is changed over from the neutral position (a) to the floating position (c).

Meanwhile, the second directional control valve 41 has a pair of hydraulic pilot portions 41A and 41B. Further, when the pilot pressure is supplied to the pilot portion 41A, the second directional control valve 41 is changed over from the neutral position (a) to the raising position (b), whereas when the pilot pressure is supplied to the hydraulic pilot portion 41B, the second directional control valve 41 is changed over from the neutral position (a) to the lowering position (d).

Here, a description will be given of a case where the control valve unit 36 is in a holding position. Namely, as for the control valve unit 36, as shown in FIG. 6, the first and second directional control valves 40 and 41 are both disposed in the neutral position (a) to stop the movement of the hoist cylinders 30, thereby allowing the vessel 3 to be set in the holding position in which the vessel 3 is stopped and held in the present position. Accordingly, in this holding position, the directional control valves 40 and 41 of the control valve unit 36 are in the neutral position (a) in which the supply and discharge of pressure oil via the actuator side oil passages 42A and 42B and the actuator side oil passages 43A and 43B with respect to the hoist cylinders 30 are stopped.

Further, a description will be given of a case where the control valve unit 36 is set in the raising position. In this case, the first and second directional control valves 40 and 41 of the control valve unit 36 are both changed over from the neutral position (a) to the raising position (b). First, when the first directional control valve 40 is set in the raising position (b), the pressure oil from the hydraulic pump 31 is supplied into the bottom side oil chamber 30G of each hoist cylinder 30 via the pump line 33, the directional control valve 40, the actuator side oil passage 42A, and the hydraulic conduit 35A. At this time, the hydraulic oil in the rod side oil chambers 30E and 30F is returned to the tank 32 via the hydraulic conduit 35B, the actuator side oil passage 42B, the directional control valve 40, the low pressure side passage 38, and the tank line 34.

Then, when the second directional control valve 41 has been changed over to the raising position (b), the pressure oil from the hydraulic pump 31 is supplied into the bottom side oil chamber 30G of the hoist cylinder 30 via the pump line 33, the high pressure side passage 37, the directional control valve 41, the actuator side oil passage 43A, and the hydraulic conduit 35A. Consequently, the inner tube portion 30B of the hoist cylinder 30 is extended downward together with the piston rod 30C, and when the inner tube portion 30B is maximally extended, only the piston rod 30C is further extended downward, thereby raising the vessel 3 to the dumping position shown in FIG. 2. Namely, at this time, the first and second directional control valves 40 and 41 of the control valve unit 36 are disposed in the raising position (b), and the hoist cylinders 30 raise the vessel 3 upward by extending by the hydraulic force.

Meanwhile, a description will be given of a case where the control valve unit 36 is set in the floating position. In this case, the first directional control valve 40 of the control valve unit 36 is changed over from the neutral position (a) to the floating position (c), and the second directional control valve 41 thereof is disposed at the neutral position (a). Further, when the first directional control valve 40 is set in the floating position (c), the actuator side oil passage 42A is connected to the low pressure side passage 38 and the tank line 34 via the directional control valve 40. Meanwhile, the actuator side oil passage 42B is connected to the low pressure side passage 38 and the tank line 34 via the below-described check valve 44B, while the other actuator side oil passage 43B is connected to the low pressure side passage 38 and the tank line 34 via the below-described check valve 46B.

Consequently, the hoist cylinders 30 are contracted in accordance with the load (self-weight) from the vessel 3, and the hydraulic oil in the bottom side oil chamber 30G is discharged to the tank 32 via the actuator side oil passage 42A and the directional control valve 40, whereas the hydraulic oil in the tank 32 is replenished from the below-described check valves 44B and 46B into the rod side oil chambers 30E and 30F via the actuator side oil passages 42B and 43B and the hydraulic conduit 35B. Thus, the first directional control valve 40 of the control valve unit 36 at this time is disposed in the floating position (c) in which the self-weight fall of the vessel 3 is allowed.

Further, a description will be given of a case where the control valve unit 36 is set in the lowering position. In this case, the first directional control valve 40 of the control valve unit 36 is returned to the neutral position (a), and the second directional control valve 41 thereof is changed over from the neutral position (a) to the lowering position (d). Namely, when the second directional control valve 41 thereof is set in the lowering position (d), the pressure oil from the hydraulic pump 31 is supplied into the rod side oil chambers 30E and 30F of each hoist cylinder 30 via the pump line 33, the high pressure side passage 37, the second directional control valve 41, the actuator side oil passage 43B, and the hydraulic conduit 35B. In addition, the hydraulic oil in the bottom side oil chamber 30G is returned to the tank 32 via the hydraulic conduit 35A, the actuator side oil passage 43A, the second directional control valve 41, the low pressure side passage 38, and the tank line 34.

Consequently, as for the hoist cylinders 30, the inner tube portion 30B together with the piston rod 30C is contracted into the outer tube portion 30A by the pressure oil supplied into the rod side oil chambers 30E and 30F, thereby downwardly rotating the vessel 3 to the transporting position, shown in FIG. 1, by the hydraulic force of the hoist cylinders 30. Namely, the directional control valve 41 of the control valve unit 36 at this time is disposed in the lowering position (d), and the host cylinders 30 are contracted by the hydraulic force to lower the vessel 3 to the position in which the vessel 3 is seated on the vehicle body 2.

Indicated at 44A and 44B are check valves for makeup disposed on the first directional control valve 40 side of the control valve unit 36, and these check valves 44A and 44B are provided between the low pressure side passage 38 and the actuator side oil passages 42A and 42B by detouring the first directional control valve 40. Further, the check valves 44A and 44B allow the circulation of the hydraulic oil in the tank 32 from the low pressure side passage 38 to the bottom side oil chamber 30G and the rod side oil chamber 30E of each hoist cylinder 30 via the actuator side oil passages 42A and 42B and the hydraulic conduits 35A and 35B, and prevent the flow thereof in the reverse direction. Consequently, the hydraulic oil is replenished to the bottom side oil chamber 30G and the rod side oil chambers 30E and 30F of each hoist cylinder 30 to thereby prevent these oil chambers from assuming the negative pressure.

Indicated at 45A and 45B are relief valves for overload prevention provided in the control valve unit 36, and these relief valves 45A and 45B are provided between the low pressure side passage 38 and the actuator side oil passages 42A and 42B by detouring the first directional control valve 40 and are respectively connected in parallel to the check valves 44A and 44B. Further, when an overload in the contracting direction is applied to each hoist cylinder 30, one relief valve 45A is opened to relieve the excess pressure in the bottom side oil chamber 30G side. Meanwhile, when an overload in the extending direction is applied to each hoist cylinder 30, the other relief valve 45B is opened to relieve the excess pressure in the rod side oil chamber 30E side.

Denoted at 46A and 46B are check valves for makeup disposed on the second directional control valve 41 side of the control valve unit 36, and these check valves 46A and 46B are provided between the low pressure side passage 38 and the actuator side oil passages 43A and 43B by detouring the second directional control valve 41. Further, the check valves 46A and 46B allow the circulation of the hydraulic oil in the tank 32 from the low pressure side passage 38 to the bottom side oil chamber 30G and the rod side oil chamber 30E of each hoist cylinder 30 via the actuator side oil passages 43A and 43B and the hydraulic conduits 35A and 35B, and prevent the flow thereof in the reverse direction. Consequently, the hydraulic oil is replenished to the bottom side oil chamber 30G and the rod side oil chamber 30E and/or the rod side oil chamber 30F of each hoist cylinder 30.

Indicated at 47 is a relief valve which is provided between the high pressure side passage 37 and the low pressure side passage 38 of the control valve unit 36 and is capable of changing the relief set pressure. The relief valve 47 determines a largest discharge pressure of the hydraulic pump 31, and when a pressure higher than said largest pressure is generated, the relief valve 47 relieves the excess pressure to the tank 32 side. In addition, the relief valve 47 has a set pressure variable portion 47A for changing over the relief set pressure between a low pressure valve and a high pressure valve.

At this time, pilot pressure is supplied to the set pressure variable portion 47A of the relief valve 47 from a below-described solenoid valve 49 via a pilot conduit 53, and when the first and second directional control valves 40 and 41 have been changed over to the raising position (b), the set pressure variable portion 47A changes over the relief set pressure of the relief valve 47 to the high pressure valve, thereby setting the discharge pressure of the hydraulic pump 31 to a high pressure.

On the other hand, when the supply of the aforementioned pilot pressure is stopped, and the directional control valves 40 and 41 have been changed over to a changeover position other than the raising position (b), i.e., to the neutral position (a), the floating position (c), or the lowering position (d), the relief valve 47 is changed over to the low pressure valve by set pressure variable portion 47A. Accordingly, at this time the discharge pressure of the hydraulic pump 31 is set to relatively low pressure so as to suppress the pressure valve of the pressure oil from becoming high more than is necessary.

Denoted at 48 is a pilot pressure supplying portion for supplying the pilot pressure to the first and second directional control valves 40 and 41, and this pilot pressure supplying portion 48 is constituted by including three solenoid valves 49, 50, and 51, as shown in FIG. 6. These solenoid valves 49 to 51 are constituted by solenoid valves of the proportional control type which variably control the pilot pressure. Further, the solenoid valves 49 to 51 are connected to a pilot hydraulic power source 52 at their high pressure sides and connected to the tank 32 at their low pressure sides. It should be noted that the pilot hydraulic power source 52 is supplied by the accumulator 19.

Here, the output side of the solenoid valve 49 is connected to the hydraulic pilot portions 40A and 41A of the directional control valves 40 and 41 via the pilot conduit 53. Meanwhile, the output side of the solenoid valve 50 is connected to the hydraulic pilot portion 40B of the directional control valve 40 via a pilot conduit 54, and the output side of the solenoid valve 51 is connected to the hydraulic pilot portion 41B of the directional control valve 41 via a pilot conduit 55.

In this case, an operating lever (not shown) constituted by a remote control means such as an electric lever is provided in the cab 12 of the dump truck 1. Then, as the operator in the cab 12 manually performs the tilting operation of the operating lever, the valve is selectively changed over to one of the solenoid valves 49 to 51, whereby pilot pressure which is proportional to the manipulated variable is generated in the pilot conduits 53, 54, or 55.

Namely, when the solenoid valve 49 is changed over from the position shown in FIG. 6 to generate pilot pressure within the pilot conduit 53, the first and second directional control valves 40 and 41 are changed over from the neutral position (a) to the raising position (b). Further, when the solenoid valve 50 has been changed over, the pilot pressure is generated in the pilot conduit 54, whereby the first directional control valve 40 is changed over from the neutral position (a) to the floating position (c). Furthermore, when the solenoid valve 51 has been changed over, the pilot pressure is generated in the pilot conduit 55, whereby the second directional control valve 41 is changed over from the neutral position (a) to the lowering position (d).

Denoted at 56 is a branch line which is branched off from a position between the hydraulic conduit 35A and the actuator side oil passages 42A and 43A and connects the hoist cylinders 30 to the tank 32. This branch line 56 is constituted by two conduit portions 56A and 56B, and the below-described manual operation valve 57 is provided between these conduit portions 56A and 56B. Further, the branch line 56 communicates or shuts off the bottom side oil chamber 30G of each hoist cylinder 30 with respect to the tank 32 in accordance with the opening or closing operation of the manual operation valve 57.

Here, as shown in FIG. 6, one conduit portion 56A is connected to the hydraulic conduit 35A and the actuator side oil passages 42A and 43A at one side and connected to the below-described manual operation valve 57 at the other side. Meanwhile, as shown in FIG. 6, the other conduit portion 56B is connected to the manual operation valve 57 at one side and connected to the tank 32 at the other side.

In this case, as shown in FIG. 5, the branch line 56 is disposed such that the other side of the conduit portion 56A and one side of the conduit portion 56B, which are located in front and rear of the manual operation valve 57, extend upward along the supporting bracket 22 on the floor 10. It should be noted that the positional relationship between the conduit portions 56A and 56B shown in FIG. 5 may be inverted between the front and the rear. For example, the conduit portion 56B may be disposed at a position close to the front side of the manual operation valve 57, and the conduit portion 56A may be disposed at a position close to the rear side of the manual operation valve 57.

Denoted at 57 is the manual operation valve which is provided between the conduit portions 56A and 56B of the branch line 56. The manual operation valve 57 has a lever handle 58 of a rotating operation type as a lever which is manually operated by the operator. The opening of a valve body (not shown) is changed in accordance with the rotational position of that lever handle 58, thereby allowing the conduit portions 56A and 56B (branch line 56) to communicate with or shut off from each other. Further, the manual operation valve 57 is capable of variably adjusting the flow rate of the hydraulic oil flowing in the conduit portions 56A and 56B (branch line 56) in accordance with the rotational position of the lever handle 58.

In this case, the manual operation valve 57 is mounted on the other side surface of the supporting bracket 22 facing the cab 12 in the transverse direction, as shown in FIG. 4, and is disposed on an upper portion of the supporting bracket 22, as shown in FIG. 5. Further, the conduit portions 56A and 56B of the branch line 56 extend upward along the supporting bracket 22, and are disposed in such a manner as to sandwich the manual operation valve 57 from the front and rear directions.

In addition, the manual operation valve 57 assumes the closed state when the lever handle 58 is rotated to the position indicated by the solid lines in FIG. 4, and is fully open when it is rotated to the position indicated by the two-dotted chain lines. Further, when the manual operation valve 57 is opened, the hydraulic oil is discharged into the tank 32 from the bottom side oil chamber 30G of each hoist cylinder 30 via the hydraulic conduit 35A and the branch line 56, so that the hoist cylinders 30 are displaced in the contracting direction in accordance with the load (self-weight) on the vessel side.

The dump truck 1 according to this embodiment has the above-described configuration, and a description will be given of its operation.

First, in a quarry of a mine or the like, the crushed stones 4 to be transported are loaded on the vessel 3 of the dump truck 1 by the use of a large-size hydraulic shovel (not shown). Then, the dump truck 1 transports the crushed stones 4 toward an unloading site in a state in which a large quantity of crushed stones 4 are loaded on the vessel 3.

Then, when the dump truck 1 has arrived at the unloading site, if the operator in the cab 12 manually performs the tilting operation of the operating lever consisting of an electric lever or the like, the solenoid valve 49 shown in FIG. 6 is energized and is changed over, thereby generating pilot pressure within the pilot conduit 53. Further, this pilot pressure is supplied to the hydraulic pilot portions 40A and 41A of the first and second directional control valves 40 and 41 through the pilot conduit 53.

Consequently, as for the control valve unit 36, the first and second directional control valves 40 and 41 of the control valve unit 36 are both changed over from the neutral position (a) to the raising position (b). Consequently, the pressure oil from the hydraulic pump 31 is supplied into the bottom side oil chamber 30G of each hoist cylinder 30 via the pump line 33, the high pressure side passage 37, the first and second directional control valves 40 and 41, the actuator side oil passages 42A and 43A, and the hydraulic conduit 35A. In addition, the hydraulic oil in the rod side oil chamber 30E and/or the rod side oil chamber 30F is returned to the tank 32 via the hydraulic conduit 35B, the actuator side oil passage 42B, the first directional control valve 40, the low pressure side passage 38, and the tank line 34.

As a result, the piston rod 30C and the inner tube portion 30B of each hoist cylinder 30 are extended by the pressure oil in the bottom side oil chamber 30G and raise the vessel 3 to the dumping position, shown in FIG. 2, so as to tilt the vessel 3 diagonally backward. At this time, as the vessel 3 is rotated to the tilted position, shown in FIG. 2, by using the connecting pin 5 as a fulcrum, the dump truck 1 is capable of discharging the crushed stones 4 in the vessel 3 toward the cargo collection site in downwardly sliding manner.

Further, when the operator releases his or her hand from the aforementioned operating lever, the solenoid valve 49 is de-energized and returns to the position shown in FIG. 6, and the other solenoid valves 50 and 51 also remain held at the positions shown in FIG. 6. Consequently, all the pressures within the pilot conduits 53, 54, and 55 become close to the tank pressure, so that the both directional control valves 40 and 41 of the control valve unit 36 automatically return to the neutral position (a). For this reason, in the bottom side oil chamber 30G and the rod side oil chambers 30E and 30F of each hoist cylinder 30, the supply and discharge of the pressure oil are stopped, so that the piston rod 30C and the inner tube portion 30B can be held in the extended state, thereby allowing the vessel 3 to be temporarily held at a standstill in the tilted position shown in FIG. 2.

Next, when, at the stage of completion of the dumping operation of the crushed stones 4, the operator manually performs the tilting operation of the aforementioned operating lever to change over the solenoid valve 50 from the illustrated position, the pilot pressure is generated within the pilot conduit 54. As this pilot pressure is supplied to the hydraulic pilot portion 40B of the first directional control valve 40, the directional control valve 40 is changed over from the neutral position (a) to the floating position (c). Meanwhile, the second directional control valve 41 maintains its state in which it is returned to the neutral position (a).

When the first directional control valve 40 is thus changed over to the floating position (c), the bottom side oil chamber 30G of each hoist cylinder 30 is connected to the low pressure side passage 38 and the tank line 34 via the hydraulic conduit 35A, the actuator side oil passage 42A, and the first directional control valve 40. On the other hand, the rod side oil chamber 30E and/or the rod side oil chamber 30F of each hoist cylinder 30 are connected to the low pressure side passage 38 and the tank line 34 via the hydraulic conduit 35B, the actuator side oil passages 42B and 43B, and the check valves 44B and 46B.

As a result, the hoist cylinders 30 are contracted in accordance with the load (self-weight) from the vessel 3, and the hydraulic oil in the bottom side oil chamber 30G is discharged to the tank 32, whereas the hydraulic oil in the tank 32 is replenished into the rod side oil chamber 30E and/or the rod side oil chamber 30F via the check valves 44B and 46B. Further, by allowing the vessel 3 to fall due to its self-weight, the hoist cylinders 30 are capable of lowering the vessel 3 to the transporting position shown in FIG. 1 and of seating the vessel 3 onto the vehicle body 2.

Meanwhile, when the dump truck 1 is in inclined state due to a bumpy terrain, a sloping ground, or the like at the working site, there are cases where even if the first directional control valve 40 of the control valve unit 36 is changed over to the floating position (c), the vessel 3 does not fall due to its self-weight. In such a case, however, if the operator performs the tilting operation of the operating lever to change over the solenoid valve 51, the pilot pressure is generated within the pilot conduit 55. This pilot pressure can be supplied to the hydraulic pilot portion 41B of the second directional control valve 41, thereby allowing the second directional control valve 41 to be changed over to the lowering position (d). At this time, the first directional control valve 40 maintains its state in which it is returned to the neutral position (a).

Accordingly, as the second directional control valve 41 thereof is set in the lowering position (d), the pressure oil from the hydraulic pump 31 is supplied into the rod side oil chamber 30E and/or the rod side oil chamber 30F of each hoist cylinder 30 via the pump line 33, the high pressure side passage 37, the actuator side oil passage 43B, and the hydraulic conduit 35B. On the other hand, the hydraulic oil in the bottom side oil chamber 30G is returned to the tank 32 via the hydraulic conduit 35A, the actuator side oil passage 43A, the low pressure side passage 38, and the tank line 34.

Consequently, as for the hoist cylinders 30, the inner tube portion 30B together with the piston rod 30C is contracted into the outer tube portion 30A by the pressure oil supplied into the rod side oil chamber 30E and/or the rod side oil chamber 30F, thereby making it possible to downwardly rotate the vessel 3 to the transporting position, shown in FIG. 1, by the hydraulic force of the hoist cylinders 30 and allow the vessel 3 to be forcibly seated onto the vehicle body 2.

Thus, as for the dump truck 1 which transports a large quantity of crushed stones 4 from a quarry of a mine or the like by loading them on the vessel 3, while the engine 29 is being operated, the directional control valves 40 and 41 of the control valve unit 36 can be changed over to one of the neutral position (a), the raising position (b), the floating position (c), and the lowering position (d) in accordance with the remote control of the operating lever or the like by driving the hydraulic pump 31, the pilot hydraulic power source 52. Thus, the extension or contraction operation of the hoist cylinders 30 can be controlled for hoisting the vessel 3 on the vehicle body 2.

In contrast, when the engine 29 is stopped, since the hydraulic pump 31 is stopped together with the pilot hydraulic power source 52 and the like, in such as the remote control of the operating lever, the directional control valves 40 and 41 of the control valve unit 36 cannot be changed over. However, at the time of performing maintenance, inspection, and the like of the dump truck 1, there are cases where by stopping the engine 29 with the vessel 3 kept raised diagonally backward, maintenance work is performed in the state in which the noise due to the engine sound is eliminated while ensuring the safety of the operator.

Then, after completion of the maintenance work, it is necessary to lower the vessel 3 in the state of being raised diagonally backward from the vehicle body 2, as shown in FIG. 2, by contracting the hoist cylinders 30. However, the temporary operation of the engine 29 for the sole purpose of lowering the vessel 3 is wasteful from the viewpoint of energy saving, and it also constitutes an extra burden on the operator.

On the other hand, if the hydraulic oil from the bottom side oil chamber 30G of each hoist cylinder 30 is discharged into the tank 32, the hoist cylinders 30 can be contracted by the weight (self-weight) on the vessel 3 side. In this case, however, there is a risk of the occurrence of an impact when the vessel 3 is seated onto the vehicle body 2, and particularly in the state in which the cargo is loaded, a large impact would be imparted to the vessel 3 and the vehicle body 2.

Accordingly, in this embodiment, the configuration provided is such that the branch line 56 branching from the hydraulic conduit 35A to connect the bottom side oil chamber 30G of the hoist cylinder 30 to the tank 32 is provided midway in the hydraulic conduit 35A or each of the actuator side oil passages 42A and 43A for connecting the control valve unit 36 and the bottom side oil chamber 30G of each hoist cylinder 30. Further, the manual operation valve 57 which is capable of variably adjusting the flow rate in accordance with the operation of the lever handle 58 is provided midway (e.g., between the conduit portions 56A and 56B) in the branch line 56.

Consequently, the hoist cylinders 30 are extended by operating the engine 29, the vessel 3 is raised from the vehicle body 2, and the maintenance work can be performed with the engine 29 stopped in this state. Subsequently, when the vessel 3 is lowered onto the vehicle body 2, the hydraulic oil can be discharged through the branch line 56 from the bottom side oil chamber 30G of each hoist cylinder 30 to the tank 32 by opening the manual operation valve 57, so that the hoist cylinders 30 can be automatically contracted.

Namely, when the manual operation valve 57 is opened by the operation of the lever handle 58, the bottom side oil chamber 30G of each hoist cylinder 30 is set in the state of being communicated with the tank 32 via the hydraulic conduit 35A and the branch line 56. On the other hand, the rod side oil chamber 30E and/or the rod side oil chamber 30F of each hoist cylinder 30 are connected to the low pressure side passage 38 and the tank line 34 via the hydraulic conduit 35B, the actuator side oil passages 42B and 43B, and the check valves 44B and 46B.

As a result, the hoist cylinders 30 are contracted in accordance with the load (self-weight) from the vessel 3, and the hydraulic oil in the bottom side oil chamber 30G is discharged from the branch line 56 side to the tank 32, whereas the hydraulic oil in the tank 32 is replenished into the rod side oil chamber 30E and/or the rod side oil chamber 30F via the check valves 44B and 46B. Further, by allowing the vessel 3 to fall due to its self-weight, the hoist cylinders 30 are capable of lowering the vessel 3 to the transporting position shown in FIG. 1 and of seating the vessel 3 onto the vehicle body 2.

Moreover, since the manual operation valve 57 in this case is capable of variably adjusting the flow rate of the hydraulic oil in accordance with the amount of the rotating operation of the lever handle 58, the contracting speed of the hoist cylinders 30 can be variably adjusted by the manual operation valve 57, thereby making it possible to minimize the impact at the time when the vessel 3 is seated onto the vehicle body 2.

In this case, when the vessel 3 is lowered from the position shown in FIG. 2 by the hoist cylinders 30, the manual operation valve 57 is first opened up to a fully open position by the lever handle 58, whereby a large amount of hydraulic oil can be discharged in correspondence with the cross-sectional area of the branch line 56, thereby making it possible to make the contracting speed of the hoist cylinders 30 fast. Further, at a stage when the vessel 3 falling by its self-weight has approached the vehicle body 2 side, the contracting speed of the hoist cylinders 30 can be made gradually slow by decreasing the opening of the manual operation valve 57, thereby making it possible to easily alleviate the impact when the vessel 3 is seated onto the vehicle body 2.

Therefore, according to this embodiment, even if the engine 29 remains stopped when the vessel 3 of the dump truck 1 is lowered onto the vehicle body 2 from the raised position, the vessel 3 can be lowered onto the vehicle body 2 by opening the manual operation valve 57, as required. Further, at this time, by appropriately decreasing the opening of the manual operation valve 57, it is possible to easily alleviate the impact when the vessel 3 is seated onto the vehicle body 2.

Consequently, it is possible to prevent the collision of the vessel 3 against the vehicle body 2, making it possible to reduce the discomfort of the operator and improve the durability and service life of the apparatus. In addition, a fixed throttle or the like need not be especially provided in each hoist cylinder 30, so that it is possible to simplify the structure of the hydraulic cylinder and attain the miniaturization of the apparatus, labor saving, and so on. Further, the vessel 3 can be lowered from the position shown in FIG. 2 to the position shown in FIG. 1 over a time period of, for instance, 40 to 80 seconds or thereabouts.

Further, in this embodiment, since the manual operation valve 57 is arranged to be disposed at a position above the floor 10 of the vehicle body 2 in the vicinity of the cab 12, the operator who has climbed into the cab 12 is able to approach the manual operation valve 57 on the floor 10 and perform the manual operation (opening/closing operation) easily, thereby making it possible to enhance the operability by reducing the burden on the operator.

At this time, since the operator is able to visually confirm the front wall portion 3A of the vessel 3 from a nearby position, the operator is able to easily discern whether or not the vessel 3 is approaching the frame of the vehicle body 2 by observing the movement of the front wall portion 3A. Accordingly, the operator is able to optimally adjust the lowering speed of the vessel 3 (contracting speed of the hoist cylinders 30) by the use of the lever handle 58.

Moreover, since the manual operation valve 57 in this case is installed at a position where it is covered from above by the protector 3B of the vessel 3, even when, for instance, earth and sand, mud, or the like attached to the peripheries of the vessel 3 have dropped so as to be exfoliated in conjunction with the lowering motion of the vessel 3, the operator can be protected from such droppings by the protector 3B of the vessel 3, thereby making it possible to prevent the droppings from colliding against the head of the operator.

Furthermore, since the manual operation valve 57 is provided with the lever handle 58 of the rotating operation type for variably adjusting the flow rate of the hydraulic oil flowing in the branch line 56, the operator is able to easily perform the opening and closing operation of the manual operation valve 57 while gripping the lever handle 58, and smoothly perform in a simple operation the flow rate adjustment of the hydraulic oil which is discharged from the bottom side oil chamber 30G of each hoist cylinder 30.

It should be noted that, in the above-described embodiment, a description has been given by citing as an example the case in which the manual operation valve 57 is provided with the lever handle 58 of the rotating operation type. However, the present invention is not limited to the same, and a configuration may be provided in which the opening and closing operation of the manual operation valve is performed by using a circular cock, handle, or the like. In other words, various manual operation valves can be applied insofar as they are valves capable of manual adjustment of the flow rate.

Further, in the above-described embodiment, a description has been given by citing as an example the case in which the control valve unit 36 is configured by the use of the first and second directional control valves 40 and 41. However, the invention is not limited to the same, and the control valve unit may be configured by the use of a single directional control valve or the like which is operated to be changed over to four positions.

Furthermore, in the above-described embodiment, a description has been given by citing as an example the dump truck 1 in which the vessel 3 is supported on the wheel type vehicle body 2 having the front wheels 6 and the rear wheels 8. However, the present invention is not limited to the same, and may also be applied to a transporter vehicle in which the vessel is mounted on a crawler type vehicle body as a loading platform.

What is claimed is:

1. A transporter vehicle comprising:
a vehicle body having an engine accommodated in an interior of said body and a cab provided on an upper side of a front portion of said body; a loading platform which is provided on said vehicle body in such a manner as to be capable of being moved vertically by the use of a rear portion side as a fulcrum so as to load objects to be transported and a front portion of said platform serving as a protector for covering the cab from above; a hoist cylinder which is telescopically provided between said loading platform and said vehicle body and in which a rod is extended so as to raise the loading platform; a hydraulic power source which is constituted by a hydraulic pump rotatively driven by said engine and a tank and is adapted to supply pressure oil to said hoist cylinder; and a control valve unit which is provided between said hydraulic power source and said hoist cylinder, and which effects changeover control of the supply and discharge of the pressure oil with respect to said hoist cylinder,
wherein a manual operation valve which is capable of lowering said loading platform onto said vehicle body when said engine is stopped in a state in which said loading platform is raised by the extension of said rod is provided between the tank of said hydraulic power source and said hoist cylinder.

2. The transporter vehicle defined in claim 1, wherein a hydraulic line connecting said control valve unit and the hoist cylinder is provided with a branch line having one side branching from said hydraulic line and another side connected to the tank of said hydraulic power source, and said manual operation valve is provided in said branch line.

3. The transporter vehicle defined in claim 1, wherein said manual operation valve is provided at a position which is in a vicinity of said cab.

4. The transporter vehicle defined in claim 1, wherein said manual operation valve is provided at a position where it is covered from above by the protector of said loading platform.

5. The transporter vehicle defined in claim 1, wherein said manual operation valve has a lever for changing through manual operation an opening of a valve body for variably adjusting a flow rate of hydraulic oil flowing out from a bottom side oil chamber of said hoist cylinder.

* * * * *